J. A. E. CRISWELL.
MANUFACTURE OF MATCHES.
APPLICATION FILED MAY 17, 1905.
988,247.
Patented Mar. 28, 1911.
6 SHEETS—SHEET 1.
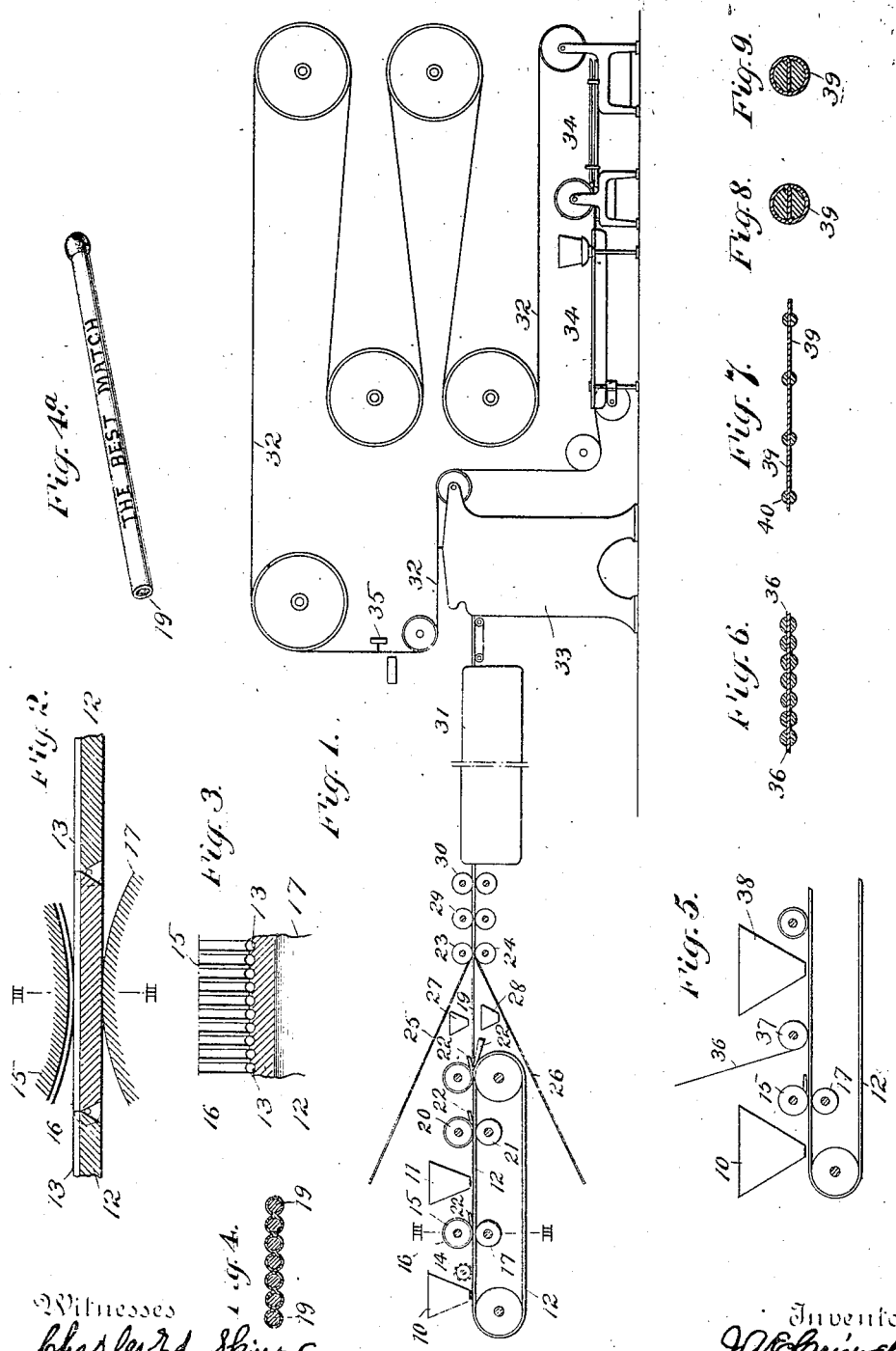

J. A. E. CRISWELL.
MANUFACTURE OF MATCHES.
APPLICATION FILED MAY 17, 1905.
988,247.
Patented Mar. 28, 1911.
6 SHEETS—SHEET 2.
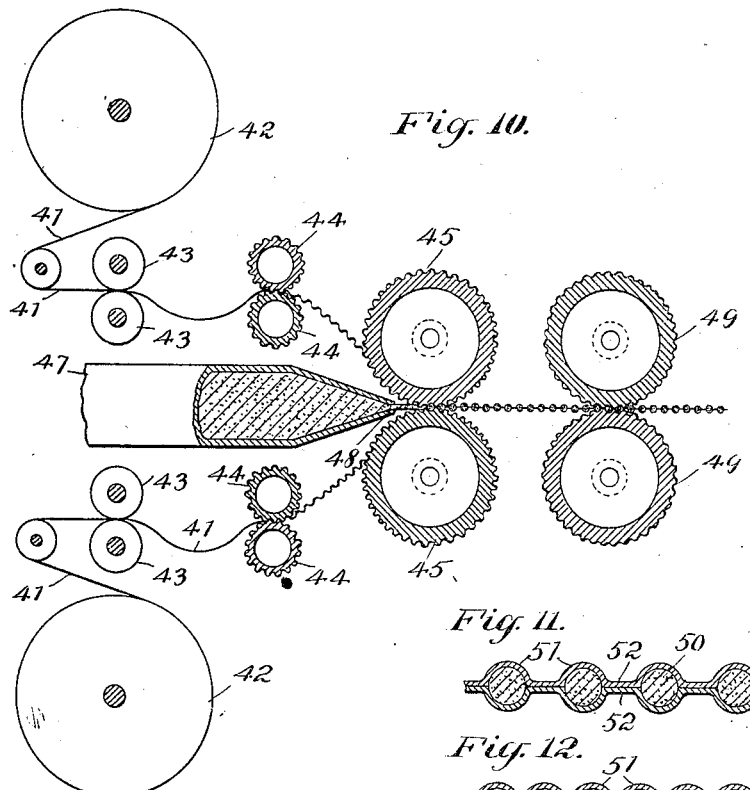
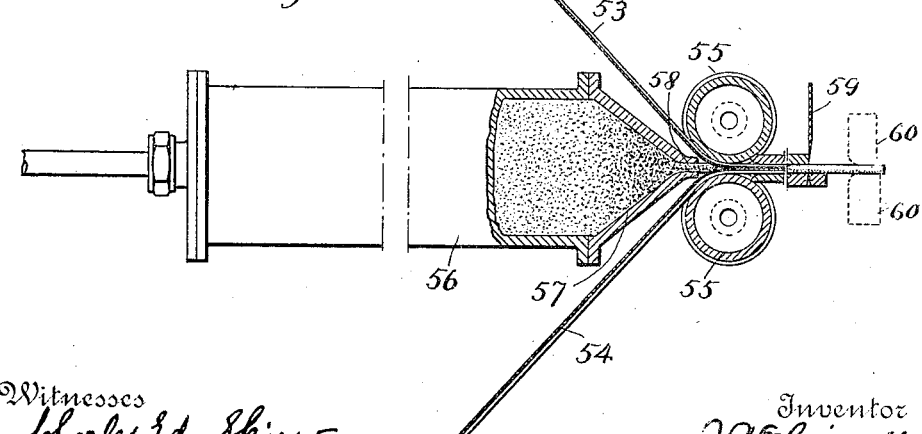
Witnesses
Charles Ed. Skirrow.
William Foster
Inventor
J. A. E. Criswell.

J. A. E. CRISWELL.
MANUFACTURE OF MATCHES.
APPLICATION FILED MAY 17, 1905.
988,247.
Patented Mar. 28, 1911.
6 SHEETS—SHEET 3.
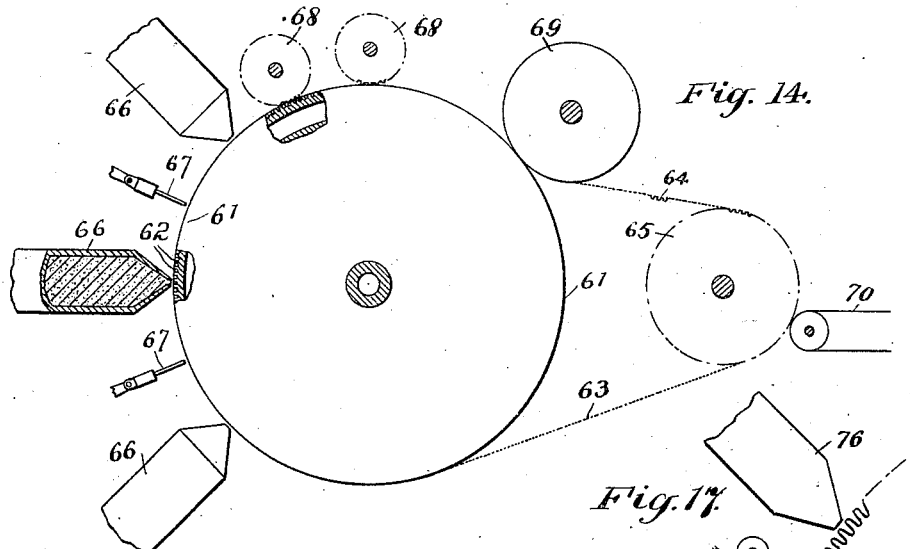
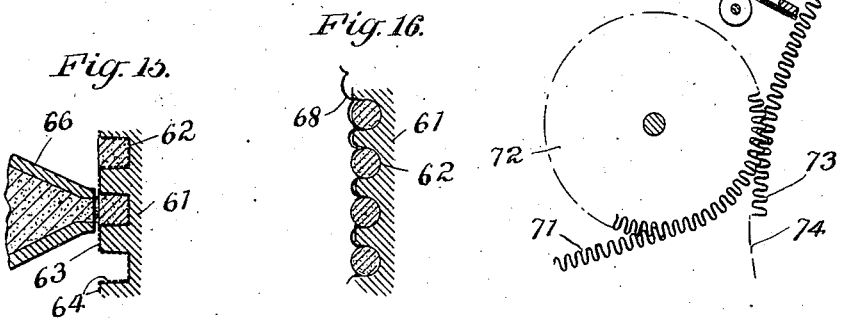
Fig. 18.  Fig. 19.  Fig. 20.  Fig. 21. 
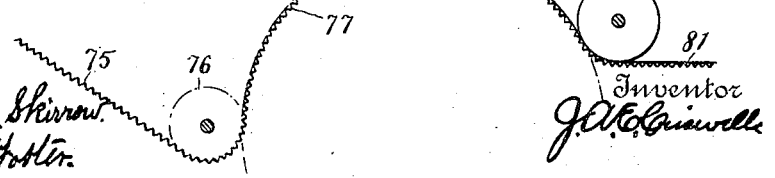
Witnesses
Charles Ed. Skirrow
William Foster
Inventor
J. A. E. Criswell J. A. E. CRISWELL.
MANUFACTURE OF MATCHES.
APPLICATION FILED MAY 17, 1905.
988,247.
Patented Mar. 28, 1911.
6 SHEETS—SHEET 4.
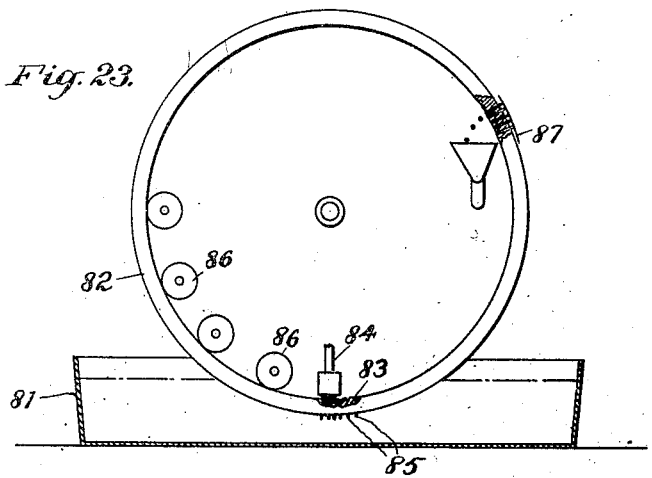
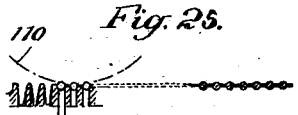
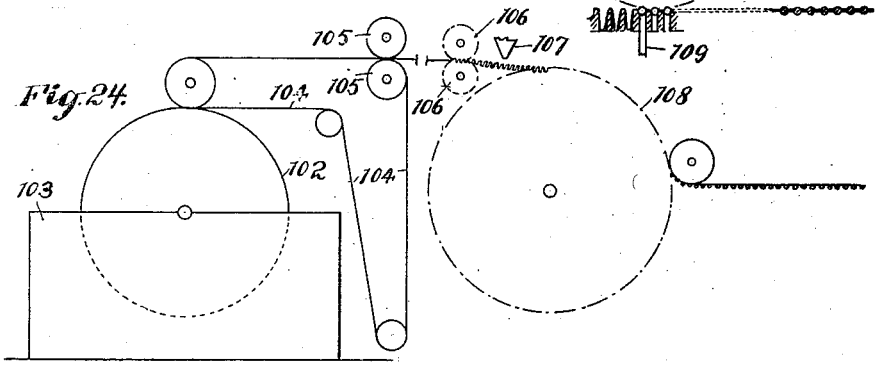
Witnesses
Charles Ed. Skirrow.
William Foster.
Inventor
J. A. E. Criswell.

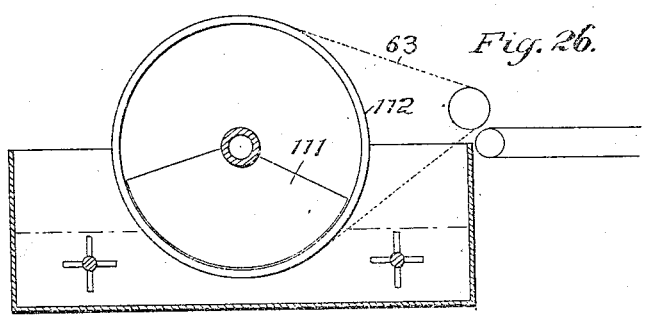
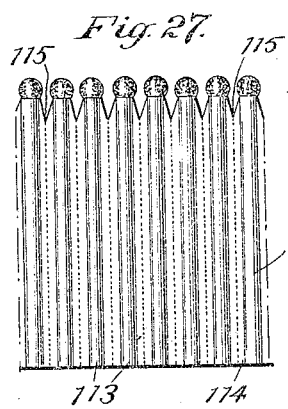
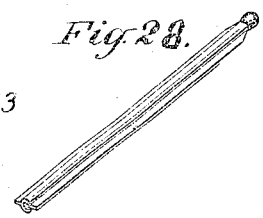
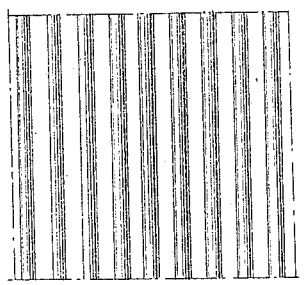

J. A. E. CRISWELL.
MANUFACTURE OF MATCHES.
APPLICATION FILED MAY 17, 1905.
988,247.
Patented Mar. 28, 1911.
6 SHEETS—SHEET 6.
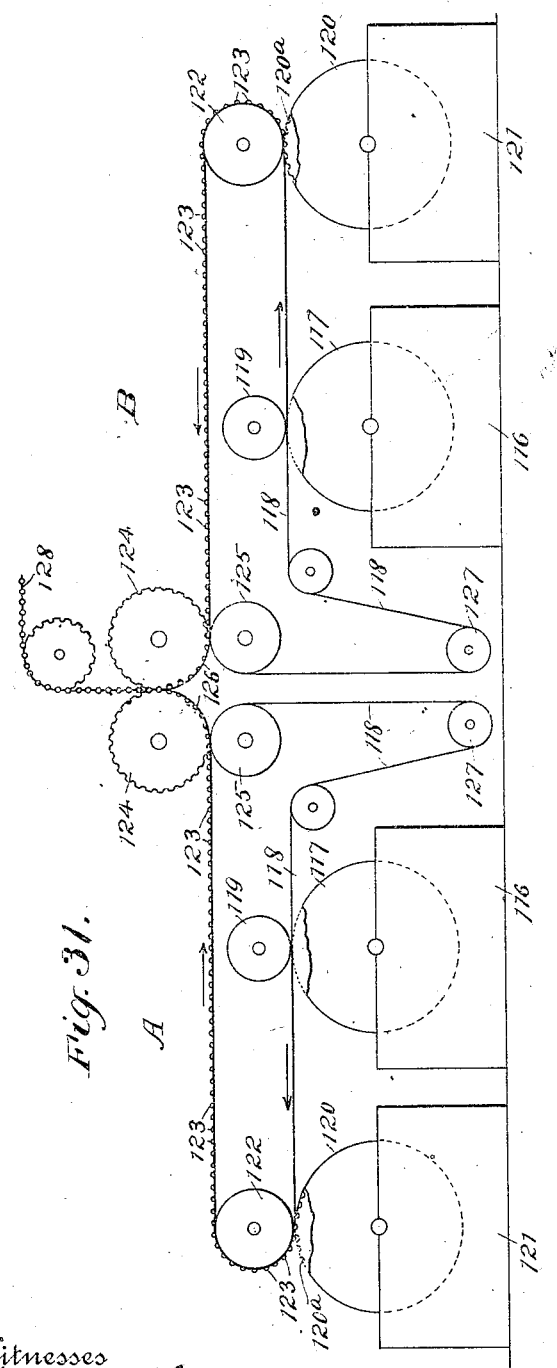
Witnesses
Charles Ed. Skirrow
William Foster
Inventor
J.A.E. Criswell

UNITED STATES PATENT OFFICE.

JAMES A. EKIN CRISWELL, OF NEW YORK, N. Y.

MANUFACTURE OF MATCHES.

988,247.

Specification of Letters Patent. Patented Mar. 28, 1911.

Application filed May 17, 1905. Serial No. 260,886.

*To all whom it may concern:*

Be it known that I, JAMES A. EKIN CRISWELL, of New York, county of Kings, and State of New York, have invented certain new and useful Improvements in the Manufacture of Matches, of which the following is a full, clear, and exact description.

This invention relates more particularly to the character of invention disclosed in my pending application Serial No. 40,548, filed December 20, 1900.

The primary object of the invention is to provide a simple and efficient method of manufacturing matches, whereby material which in many instances goes to waste may be utilized for this purpose; which produces strong, cheap and efficient matches of a uniform standard of size, strength and quality, so that the liability of being broken in use is reduced to a minimum; which matches burn longer and can be made stronger and more uniform than the ordinary wood match; which are comparatively inexpensive to manufacture, and which are attractive in appearance and on each match may be printed or produced suitable characters for advertising purposes.

A further object of the invention is to provide matches each having an inner strengthening core or body with an outer cover of inflammable material.

The invention will be hereinafter more particularly described with reference to the accompanying drawings which form part of this specification, and will be then pointed out in the claims at the end of the description.

In the drawings, Figure 1 is a side elevation, partly in section and partly diagrammatic, of one form of apparatus for carrying the invention into effect. Fig. 2 is a fragmentary longitudinal section of the means for forming the inner cores. Fig. 3 is a transverse fragmentary section taken on the lines III—III of Figs. 1 and 2. Fig. 4 is a transverse section of the match sheet before being severed or cut into complete matches. Fig. 4ᵃ is a detailed perspective view of one of the completed matches. Fig. 5 is a diagrammatic view showing different means for making match bodies. Fig. 6 is a transverse section of the web of attached splints as made by the apparatus shown in Fig. 5.

Fig. 7 indicates how the bodies of the splints are made separated some distance apart so that the uniting portion of the material may be cut and folded by suitable means to form a part of the body of each match and to serve as a cover therefor. Figs. 8 and 9 show different ways of folding the paper cover. Fig. 10 is a longitudinal section, partly in elevation, of other means for carrying into effect the making of match bodies. Figs. 11 and 12 are transverse sections, on an enlarged scale, of the match bodies before they are separated into complete splints, showing the bodies in different relations with respect to each other. Fig. 13 shows still another method of making the match bodies, and forming the splints ready for completing the matches. Figs. 14 to 17 inclusive show other means for forming the match bodies or splints. Figs. 18 to 21 are transverse sections of various forms of splint bodies or stems. Fig. 22 shows another method of making the splint bodies. Fig. 23 shows how splints may be made without uniting them together in a web or sheet. Fig. 24 shows how the splints may be formed and held ready for dipping. Figs 24 and 25 show other means for forming the match splints or bodies. Fig. 26 shows another method of collecting the pulp and forming the match splints. Fig. 27 is a plan of one form of match card or sheet. Fig. 28 is a perspective view of one of the matches shown in Fig. 27 removed from the card or sheet. Fig. 29 is a fragmentary plan of one form of match splint sheet, and Fig. 30 is a transverse section of a form of match-splint sheet in which the entire body portion of the match splints is of the same material. Figs. 31 to 33 show other methods of making match bodies.

The material for the core or inner part of the match bodies may be of any of the materials used in paper making or of any other materials suitable for this purpose. If old newspapers, straw, wood pulp, paper chips, scraps, old waste rags, or material of this character alone or a combination of them is used they may be treated in a manner similar to the preliminary steps employed to make paper or paper board to reduce the materials to a pulpy condition, which will be referred to hereafter as pulp or paper pulp. The method of reducing such material to a pulp of suitable consistency is well known in paper making and is not explained herein in detail.

Any form of apparatus or combinations of apparatus may be employed for carrying the invention into effect. In Figs. 1 to 3 one form of apparatus is shown. Here the pulpy mass or paper pulp is placed into troughs or receptacles 10 and 11, from the first of which it is fed or forced by any suitable means to a traveling endless apron or chain 12 forming a mold or form. The chain 12 comprises a series of plates or beds hinged together at their edges and on the upper or outer surface of which are longitudinal-extending grooves 13, which form one-half of the mold for the core of the matches. The paper pulp as it is deposited in the chain 12 will fill the grooves and will be carried along under the roll 14. This roll will level and spread the pulpy mass so that when it passes under the roll 15 it will be compressed to substantially the form the core is to be before being covered. The roll or drum 15 has peripheral grooves 16 opposed to the grooves 13, to form the other half of the core, the roll 15 differing according to the shape of the matches to be made. A roll 17 is arranged under the roll 15 and in engagement with the under surface of the chain 12 and takes the downward thrust of the chain while giving the preliminary pressure to form the match cores. There may be a further supply of material when necessary from the receptacle 11, and a second and final pressure and formation of the cores 19 by the rolls 20 and 21, which latter are similar to the rolls 15 and 17 and compress the cores of the matches to the desired hardness and consistency. The pressure of the rolls unites the fibers of the pulp and removes part of the moisture, and to assist in this and to form the cores the rolls and other parts may be heated and the bed or chain 12 made so that the water, moisture or other liquid may escape readily as it is pressed out of the material. Each pressure roll as well as the grooves of the chain 12 may have a scraper 22 with fingers that enter the grooves to retain the cores in a horizontal plane and prevent them from adhering to the metallic surfaces.

The cores 19 may be entirely severed from each other or may be attached so as to form a sheet or web-like body with a thin film between each core. The cores pass from the roll 20 and bed or chain 12 to the pressure rolls 23 and 24, between which latter pass webs of paper 25 and 26. These webs or sheets of paper 25 and 26 may be corrugated longitudinally before reaching the rolls or they may be plain as desired. The webs of paper may be corrugated in the same machine, or in a separate machine, and in any case may be fed either wet or dry, though the paper webs when corrugated dry hold their form better. The corrugations in the paper conform to the shape of the cores and the finished match bodies or stems, and one web is fed on one side of the cores, and the other web on the other side. A receptacle 27 is arranged to sprinkle flour, starch or other material over one side of the cores, and a second receptacle 28 is provided to spread similar material over the upper face of the web 26, in order that the cores and webs may be united as they pass between the first set of rolls. The rolls 23 and 24 are peripherally grooved according to the shape of the matches to be made, and the web of match bodies passes between sets of rolls 29 and 30 similar to the first set for further compressing and uniting the parts together. From the pressure rolls the web of match bodies, if not sufficiently dry, may pass through a suitable drier 31 and from there to a machine for cutting the long match bodies into complete match splints.

The match bodies may be handled and the matches completed in any desired way. The splints or match bodies may be made far enough apart so that further separation is unnecessary, or they may lie close together as shown in Fig. 4, in which case it is necessary to further separate the splints. In either case the web of match bodies may be cut and assembled by such machinery or devices as is shown in my Patents Nos. 716,810, 716,816 and other of patents issued to me December 23, 1902, or by any other preferred means. The match bodies, if close together as in Fig. 4, are cut, separated and forced into a suitable carrier 32 by the machine 33 as set forth in the patents referred to, and are then heated, paraffined, and the heads applied by the devices 34 in the usual manner. The carrier is of the usual or of any preferred form, and when the match heads are dry they are ejected by the device 35, and transferred for boxing.

It will be understood, where the material is of such a character as to require or make it desirable that it be reduced to a pulp or pulpy mass, that any of the machinery, devices, or methods used in paper or paper board making may be used either in the reduction of the material to a pulp, or in handling the pulp after it is made.

In Figs. 5 and 6 the pulp is gathered and compressed in grooves of the movable endless apron or chain 12 as previously described. A web of paper 36 is then fed from any source to the apron 12 under the roll 37, which latter presses the web of paper into contact with the material in the grooves of said apron. Material is supplied to the upper surface of the web of paper from the receptacle 38 or otherwise, and is compressed as already explained to form the upper part of the match body. The paper web serves as a means to unite the match bodies together in a sheet or web of match bodies, and said bodies may be separated and handled in any preferred manner. The material on the opposite sides of the paper web may be of any suitable kind and may be fed in various ways to the paper web.

Fig. 7 shows the match bodies separated farther apart than in Fig. 6. In this case the intervening web or film 39 between the match bodies 40 may be cut away and used over again to make the pulpy mass, or it might be cut along lines that would permit it to be folded in tubular form to inclose and form a part of the match bodies as shown in Figs. 8 and 9.

In the manufacture of the matches where the material is of such a nature as will not readily unite by compression or the usual method of treatment, glue, starch or other substances may be employed to assist in causing the parts or materials to unite properly, and such substances may be added or applied at any stage of manufacture.

The method of manufacture shown in Fig. 10 arranges the match bodies transversely of the web instead of lengthwise thereof as in Fig. 1. Here the paper 41, which may be of any suitable width, is fed from the rolls 42 by means of the feed rollers 43 to the corrugating rolls 44. These rolls 44 may be heated and are grooved lengthwise thereof so that as the paper passes between said rolls it is crimped or corrugated to substantially the form of one-half the match body. As shown there are two webs of paper which after being corrugated pass to the pressure rolls 45, the latter being grooved lengthwise to form opposite halves of the match bodies. Intermediate the webs of paper and adjacent to the rolls 45 is a cylinder or device 47 in which paper making pulp or other material is placed. The device 47 is provided with a slot or opening 48 through which a layer of material is forced by means of a piston or rotary device, not shown, which is timed to the movements of the other parts so that a layer of the material will be forced between the rolls 45 and into the corrugations of the paper webs. The material from the device 47 will form the inner core for the match bodies, and as the cores and paper covering are united, a ribbed sheet or web of match bodies is provided. A second compression may be given by the rolls 49 and as many more as desired. If necessary the webs of match bodies may pass through a suitable drier or may be made into a large roll, and if desired the webs may correspond in width to the length of a match and made into a roll.

As already explained the match bodies may be separated some distance from each other as in Fig. 11 or lie close together as in Fig. 12. In these figures, 50 indicates the core of the matches, 51 the cover, and 52 the film or portion that connects the match stems or bodies together. Instead of the layer of material being forced from the device 47 direct to the pressure rolls 45, it might first pass between grooved or fluted rolls to form a web of cores of the shape of the match bodies and to express some of the moisture therefrom. In this latter case there may be applied some adhesive substance if necessary to the surfaces of the parts to be united as already explained.

Fig. 13 has two webs 53 and 54 of strawboard, wood-pulp or other material, that may be corrugated in the same machine, or formed in a separate machine, and this straw-board or layer of wood pulp is preferably in the form of a web and longitudinally corrugated to correspond to the size and shape of the splints. The corrugations are of sufficient depth to form substantially one-half the thickness of the splint or match body to be made, and the webs are made to pass between two fluted or peripherally grooved rolls 55 that guide and press the webs together. Interposed between the two webs and adjacent to the fluted rolls 55 is a cylinder 56. This cylinder has a nozzle 57 provided with a series of apertures 58 spaced apart equal to the spacing of the splints and the corrugations of the webs 53 and 54, and through the apertures passes the material from the cylinder to and between the corrugated portions of the two opposed webs and thereby forms a central core for each match strip or splint. The material forming the central core may be of any suitable kind and may consist of wood pulp or other material combined with other material whether glutinous or not, such as starch, glue or rosin, in any desired proportions. In the cylinder 56 is adapted to move a piston or rotary device, which, as it is operated, forces the material out of the cylinder, through the openings 58 in the nozzle 57. The speed of the forcing device is timed with respect to the inward movement of the webs 53 and 54 so as to supply the proper quantity of material forming the core for the splints between the webs. If the material is of a glutinous nature, the material will unite the two webs together, and it should be of such a nature that the material forming a part of the match body will stiffen the cover formed by the webs 53 and 54. The web of splints may then pass through a suitable drier to dry the web, and then the web may be cut between the corrugations to form individual match splints. These match splints may be smoothed or polished if desired, and may then be cut off the proper length by a cutting device 59, the splints being handled by a transfer device 60 and delivered to suitable splint frames in a manner substantially the same as in the patents referred to or in any desired way. The illustrations in Figs. 11 and 12 may also represent transverse sections of matches made according to this method.

Figs. 14 to 16 show how splints or match bodies may be made from pulpy or a plastic material without providing a central core and uniting them in a web or sheet. Here the wheel or drum 61 has grooves 62 corresponding to the shape of match splints to be made, and passing around the drum is a band or apron 63. This apron may be of woven wire and may be corrugated, as at 64, to fit into the grooves of the drum and then passes around the wheel 65. A series of cylinders or devices 66 are arranged adjacent to the periphery of the drum 61, and in each cylinder or device is material of any suitable kind which is adapted to be forced from the device 66, as described in connection with Fig. 10, into the grooves 62 on to the apron 63. The material for making the match splints or bodies may be of any of the usual paper making materials combined or not with others, and is of such a character as when dry and hardened the match will not be easily broken in use. For this purpose flour, starch, earthy or other substances may be combined with the pulpy material in suitable proportions. Between each of the cylinders are the packing plungers 67 so that the material from the first two cylinders 66 may be suitably compressed and made compact. The wheels 68 are for compressing what material is supplied from the last cylinder 66, and as the drum and apron 63 continue to move, the apron as it passes around the wheel 69 will remove the splints from the drum. The splints may be ejected and deposited on the belt 70 to be carried to a drier if necessary, or handled as desired. The drum may be heated to assist in drying the match splints and may be so made that the moisture may be readily forced out of the match bodies. By this means match bodies of various shapes, and of uniform quality may be made rapidly. In practice it is desirable to place a number of these drums on the same shaft each having grooves of a size and shape corresponding to the finished match body.

In Figs. 17 and 18 a single corrugated web or band of paper is used to cover the inner cores. The corrugated web 71 passes around the toothed wheel 72 and enters the grooves 73 of the drum 74. The core in this case is of fibrous material with the strands arranged lengthwise of the match bodies. Disintegrated woody material, straw or other material which has not been reduced to a pulp may be used, and this material may be softened or not by boiling according to its nature. The material may be fed by the feed rolls into the corrugations of the paper, and where necessary a knife may be used to supply just the proper quantity to the webs. A cylinder 76 may be provided to force pulpy material into the corrugations over the long fibrous material and this may be compressed as already explained to unite the materials forming the match bodies.

The cores of the match bodies may be of any suitable material whether of long strands of woody fiber, straw, excelsior mixed with wood pulp, paper pulp or not, and such materials may be inclosed by a single piece of ribbon or paper. A single web of paper may be cut into long strips or ribbons, or separate rolls of ribbons of paper, one for each long core may be used. In this case the cores are first formed, and the ribbon of paper forced or formed around each core and united therewith to provide long match bodies which when cut transversely form complete match splints or bodies.

In Fig. 19 the cores are shown as only partly inclosed by the paper cover, while Fig. 20 shows how the web of paper may be cut centrally between the cores and then folded over to entirely inclose the cores.

Fig. 21 shows a triangular form of match body in which the core is inclosed by a single strip or ribbon, and Fig. 22 shows how the same shape of body may be made from two webs and a filling or core, though in some instances the cores or filling might be dispensed with. The web 75 is corrugated transversely and passes around the toothed wheel 76 into the teeth or grooves of the drum 77. The corrugations may then be filled with material to form cores as already explained, or in any preferred way, and over the filling is passed a second web 78 which is united to the web 75 and the filling. The web 78 passes around the roll 79, and the web of match bodies passes around the roll or wheel 80, the two webs and the filling or cores forming a web of match bodies 81, to be handled in any desired way for the purpose of making matches.

Fig. 23 shows another method of making match bodies or splints. The tank 81 contains paper making pulp, and adapted to rotate in the tank is a drum or wheel 82. This wheel has pockets, grooves or corrugations 83 into which the pulp is forced by the reciprocating device 84. The pockets 83 have openings through the rim of the wheel 82 and in these openings are plungers 85 which close a part of said openings. The pulp after being forced or compressed in the pockets is further compressed by the rotary device 86 or otherwise. As the wheel 82 continues to rotate the plungers 85 will engage the cam surface 87 and will eject the splints into the receptacle 88 from which they may be removed and the matches completed.

Fig. 24 shows how the pulp may be collected as in paper making. The cylinder 102 rotates in the tank 103 and the pulp is couched on to the felt 104. The web passes from the pressure rolls 105 and when necessary is dried. It is then corrugated by the rolls 106, and material is fed into the corrugations from the receptacle 107. The web then passes to the drum 108 and is compressed so as to form a web of match bodies as already explained. Instead of the corrugated paper being filled with other material, the corrugations might be deeper and while in the grooves in the drum might be compressed by a plunger 109 as shown in Fig. 25. The plunger forms one-half of the splints, and a wheel 110 the other half, and to assist in uniting the parts of the web together flour, or any other substance might be used.

In Fig. 26 the material in the tank is drawn into the grooves or pockets by a suction device 111 arranged within the drum 112, the material being compressed into match bodies in any suitable manner.

Fig. 27 is a plan view of a match card with distinctive bodies 113 and connecting films 114. A part of the card is cut away at 115 between the match bodies and at one edge to permit said bodies to be tipped with the composition, and the film connecting the bodies may be perforated or scored between the match bodies so that each match body may be individually removed; or the cards, strips or sheets might be cut to form matches as in Fig. 29.

Fig. 29 is a fragmentary part of a web of match bodies, the latter extending either transversely or longitudinally thereof; while Fig. 30 shows how the web of match bodies may be made of the same material throughout. If the match bodies extend transversely of the web, and are far enough apart for dipping, the web may be cut into ribbons the length of the match and one edge of the ribbon notched as in Fig. 27. In this case the ribbon of match bodies may be coiled for dipping or dipped in strips as desired.

In my application Sr. No. 40,548, filed December 20, 1900, is disclosed paper covering inclosing strengthening cores and such is therefore not broadly claimed herein.

It will be understood that where the nature of the material requires it, or it is desirable to do so, it may be impregnated to prevent glowing, and any part or all of the material may be colored, or differently colored, to make the match attractive or distinctive.

Each match may have printed matter produced on its outer surface for advertising purposes, either on the paper covering before the match bodies are made, or on the match bodies themselves, and the match bodies may be passed through paraffin or like material to make wax matches.

The term "paper" is used in its broadest sense and includes a web, sheet or strip of any thickness and of any of the materials used in paper making; and "paper pulp" is intended to include any of said materials which may be reduced to a pulp or to a plastic condition.

Any of the materials mentioned in my application referred to, or in my applications for improvements in matches Serial No. 166,794, filed July 24, 1903, and Serial No. 241,234 filed January 16, 1905, may be used if desirable or any combination of them. Some of the materials may be boiled to soften them, and in some instances the materials may be softened in any manner and used in a soft state instead of being reduced to a pulp.

The materials or any of them may be chemically or otherwise treated, and to any of the materials may be added rosin, sulfur, saltpeter or other substances to make the materials burn more readily, or any suitable binding agent may be used where materials are employed that do not unite easily, and suitable material as plaster of Paris or other substances may be used to assist in making the match body stiff and firm.

It will be seen from the foregoing that various materials ordinarily going to waste may be utilized in the manufacture of matches; that cheap and inexpensive materials may be used, and materials utilized in those countries or localities where there is a scarcity of wood, and that in making matches according to the method herein disclosed a strong, effective article of uniform quality is produced.

Where a flexible wire or other apron or web is used while forming the cores or the match, an apron may be used on both sides of the material instead of on one side only.

The web of match bodies may be made on a modified form of paper board machine as shown in Figs. 32 and 33. The parts A and B of the apparatus are each intended to produce one-half of the web and are identical in construction, the felts being made to move in opposite directions. A description of part A will answer equally well for B. The pulp tank 116 has the usual cylinder mold 117 with its fine wire covering for collecting the pulp which is couched on to the felt 118 by the roll 119. A second cylinder mold 120 rotates in the pulp tank 121, said cylinder being similar to 117 except that it has depressed portions 120$^a$ corresponding to substantially one-half of the match body. This cylinder forms a web of ribs 123, which unite with the web or layer of pulp from the other cylinder 117. The layer of pulp and felt passes between the pressure rolls 124 and 125, the former being grooved, which forms one-half of the match web 126. The felt passes around the roll 127 back to the cylinder to again receive pulp. The other half of the match web from the part B unites with the web from the part A as they move between the rolls 124, forming thereby a web of match bodies 128. The match bodies thus formed may be handled to complete the matches in any preferred way. Only one part, as A, of the apparatus may be employed if desired, and instead of one of each kind of cylinders there may be two or more. This method produces a compact homogeneous match body.

Instead of the pulp material being the same in quality in all the tanks, the inner part of the body may be made of one kind of pulp, as cheap old newspapers, etc. indicated by 129, while the outside or lining 130 may be of better material, as manila or the like.

The ribs may be formed longitudinally of the web by making the mold cylinder accordingly; and where two webs are to be joined as in Fig. 31 to form complete match bodies the webs may be united while wet, or they may be united after they are dry.

Having thus described my invention, what I claim as new and desire to secure by Letters Patent is:—

1. In the manufacture of matches, the method which consists in corrugating a sheet or web of paper, forming cores of pulpy material and filling the depressed portions or corrugations of the paper therewith, and then compressing and uniting the whole to form the body of the splints.

2. In the manufacture of matches, the method which consists in corrugating a sheet or web of paper, forming cores of pulpy material and filling the depressed portions or corrugations of the paper therewith, then compressing and uniting the materials to form the body of the splints, and finally cutting the web to form complete splints.

3. In the manufacture of matches, the method which consists in corrugating a sheet or web of paper, filling the depressed portions or corrugations of the paper with a pulpy material so as to form an inner core therefor, then compressing and uniting the materials to form long splints joined together in a web by the paper so that the splints will be much larger in cross-section than the thickness of the paper which joins them together, and finally cutting the web to form complete splints.

4. In the manufacture of matches, the method which consists in corrugating a sheet or web of paper to form an outer body for the splints, forming a core of pulpy material and filling the depressed portions of the sheet therewith on one side only, then compressing the material together to form the splints and finally cutting the web to form complete splints.

5. In the manufacture of matches, the method which consists in corrugating a sheet or web of paper to form an outer body for the splints, forming a core of pulpy material and filling the depressed portions of the sheets therewith on one side only, compressing the material together to form long splints which are united together by a film of the thickness of the sheet of paper thereby forming distinctive match splints, and finally cutting the web to form complete splints.

6. In the manufacture of matches, the method which consists in taking corrugated paper to form an outer body for the splints, forming a core for each splint to fit the corrugations, finally uniting the paper and core together, and finally cutting the web to form complete splints.

7. In the manufacture of matches, the method which consists in providing corrugated paper to form an outer body for the splints, forming cores for the splints, and uniting the paper body and cores together to form splints.

8. In the manufacture of matches, the method which consists in forming a layer of wet paper-making material in a pulpy state, compressing this material to substantially the form of the match bodies to form inner cores, inclosing these cores with corrugated paper, separating the match splints along their length to form long independent match splints, then cutting the match splints transversely to form complete splints.

9. In the manufacture of matches, the method which consists in corrugating a sheet of inflammable material, filling depressed portions of the sheet with a material to form cores for the match splints, then inclosing the cores to form complete match splints, and finally cutting the web to form complete splints.

JAMES A. EKIN CRISWELL.

Witnesses:
CHARLES ED. SKIRROW,
WILLIAM FOSTER.